United States Patent [19]
Doorley et al.

[11] 3,857,282
[45] Dec. 31, 1974

[54] PORTABLE TESTER FOR HYDRAULIC POWER CIRCUITS

[75] Inventors: Richard B. Doorley, Pittsburgh; Emeric Gaslevic, Glenshaw, both of Pa.

[73] Assignee: Trace, Inc., Pittsburgh, Pa.

[22] Filed: Apr. 30, 1973

[21] Appl. No.: 355,559

[52] U.S. Cl.................... 73/168, 73/231 R, 73/344, 137/271
[51] Int. Cl.............................................. G01f 1/06
[58] Field of Search..... 73/168, 231 R, 231 M, 349, 73/420, 344, 345, 22 P, 422 R; 251/266, 267; 137/271, 269

[56] References Cited
UNITED STATES PATENTS

| | | | |
|---|---|---|---|
| 1,754,138 | 4/1930 | Agee | 251/266 |
| 3,187,244 | 6/1965 | Summerer | 200/19 M |
| 3,316,767 | 5/1967 | Leibert | 73/228 |
| 3,354,716 | 11/1967 | Wiebe | 73/168 |

FOREIGN PATENTS OR APPLICATIONS

| | | | |
|---|---|---|---|
| 874,464 | 5/1960 | Great Britain | 73/231 R |

*Primary Examiner*—Herbert Goldstein
*Assistant Examiner*—Denis E. Corr
*Attorney, Agent, or Firm*—Brown, Murray, Flick & Peckham

[57] ABSTRACT

A hydraulic circuit tester housing has a pair of bores extending inwardly from one end to provide an inlet port and an outlet port to register with corresponding ports in the top of a base of a connector permanently connected in a hydraulic circuit. When not supporting the tester housing, the connector base is covered by a cap and fluid flows through the connector. The inner ends of the tester housing bores communicate with each other, and a throttling valve is adjustably mounted in one of the bores. Associated with the other bore are electric signal emitting means responsive to certain fluid conditions in the housing, and the signals are transmitted to means for indicating what those fluid conditions are.

7 Claims, 5 Drawing Figures

3,857,282
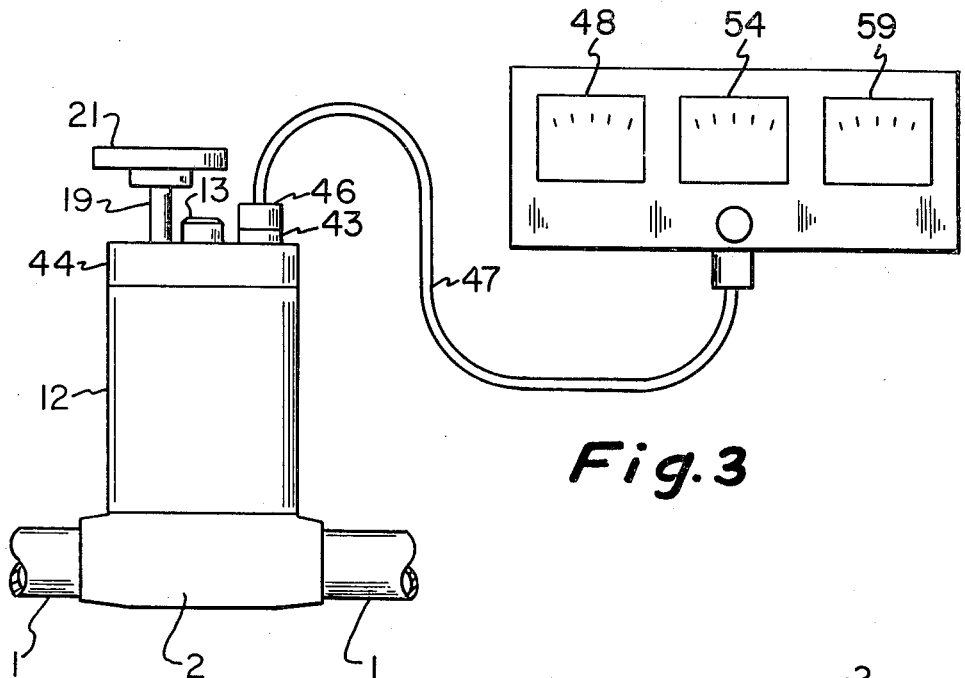
Fig.3
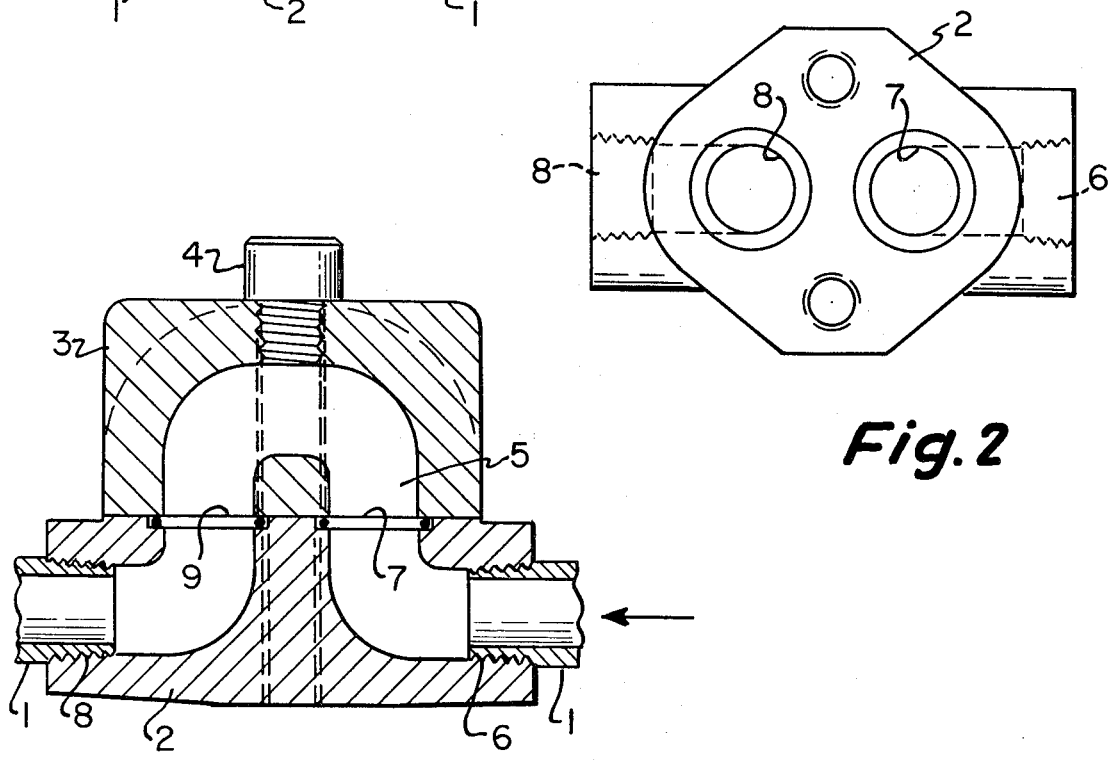
Fig.2
Fig.1

PORTABLE TESTER FOR HYDRAULIC POWER CIRCUITS

Trouble shooting of hydraulic power circuits is becoming progressively more difficult as the circuits and their components become more complex, compact and require higher performance levels. In order to discover the trouble and its location in a circuit, tests must be made at different points in the system to show either the rate of fluid flow, the fluid pressure or its temperature or any two or all three of these. Breaking the hydraulic line to get into the circuit can mean loss of considerable fluid and the possibility of introducing foreign matter into the system. One attempt to solve the problem is disclosed in Reissue U.S. Pat. No. 27,354, in which the fluid lines are provided at strategic points with special receptacles that form connections between different lines in a circuit. To conduct a test at any one of these receptacles its cover is removed and a probe that is connected with a meter is inserted in the deep cavity of the receptacle and sealed in it. Resumption of flow of fluid through the circuit will act on this probe in such ways as to register rate of flow, pressure and temperature. All of the test readings are made through the medium of strain gauges. Such a testing device performs well under some conditions, but not so well under others. The flow measuring means includes a vane against which the stream impinges. Its response to the flow is non-linear and sometimes erratic and also is influenced by the angle of the vane to the stream, the angle being changed as the probe is turned in the receptacle to throttle the flow. At high rates of flow, the fluid may become turbulent in the vicinity of the vane and thus produce false readings. Also, the electrical outputs from the strain gauges sometimes interfere with one another and develop false readings. Flow modulating or throttling by rotation of the probe produces hydraulic imbalance that presses the probe against the side of its housing and makes it difficult to turn when the fluid pressure is high. Finally, the probe requires a receptacle or cavity of considerable depth, so that it cannot be used with manifolds and modules that do not have that depth.

It is among the objects of this invention to provide a hydraulic testing device which avoids the above-mentioned objections, which does not require any cavity to receive it, which has flow measuring means that is always impinged upon at the same angle by the fluid, which does not use strain gauges that may interfere with each other by interacting, and in which the modulating of the fluid flow is accomplished by a pressure-balanced valve.

The preferred embodiment of the invention is illustrated in the accompanying drawings, in which FIG. 1 is a vertical longitudinal section through a connector between two pipes of a hydraulic circuit;

FIG. 2 is a plan view of the base of the connector after its cap has been removed;

FIG. 3 is a reduced elevation of the tester mounted on the connector base;

Figures 4, 5:
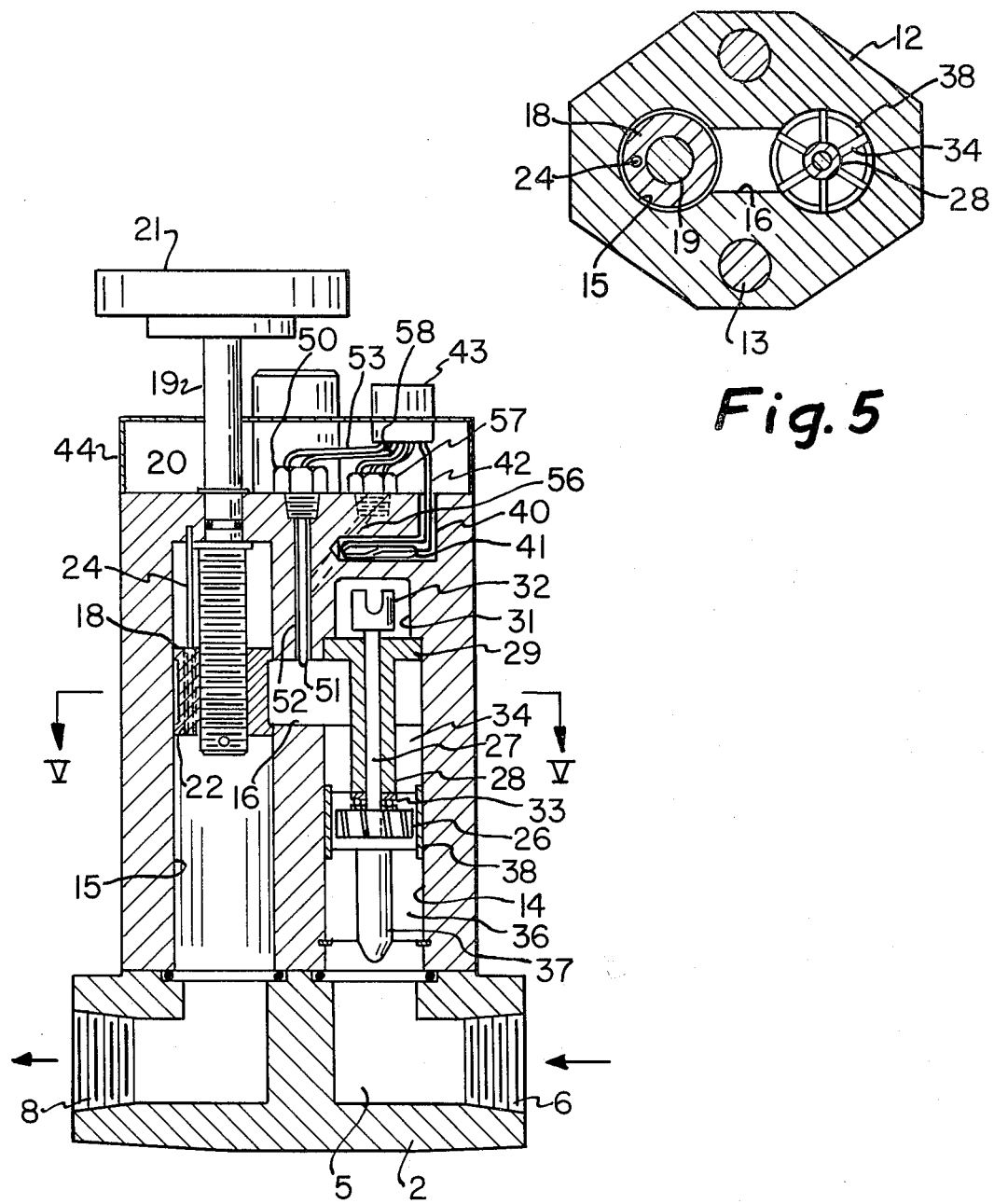
FIG. 4 is an enlarged vertical section through the tester and connector base.
FIG. 5 is a horizontal section taken taken on the line V—V of FIG. 4.

Referring to FIGS. 1 and 2 of the drawings, the adjacent ends of a pair of pipes 1 in a hydraulic power circuit are connected by a connector having a fluid passage through it. The connector is formed principally from a base 2 and a cap 3 that normally are clamped together by cap screws 4. The passage 5 extends in from one end of the base and then up into the cap and down again and out the other end of the base. That is, an end portion of the passage extends from an inlet 6 in one end of the base inwardly and up to a port 7 in the flat top of the base. Another end portion of the passage extends from the outlet 8 in the base inwardly and up to another port 9 in the top of the base. These two ports, shown best in FIG. 2, are connected by the central inverted U-shape portion of the passage which is in the cap. Connectors such as this may be located at strategic points in the hydraulic circuit where it may become desirable to make tests if trouble develops in the circuit. If that happens, the flow through the circuit is turned off temporarily at a shut-off valve and then the cap is removed from the base of one of the connectors closest to the suspected trouble spot. The only fluid that will be lost is the small amount in the passage through the cap.

The housing 12 of a testing device with a flat bottom or mounting surface then is mounted on the flat top of the connector base, as shown in FIG. 3, where it is clamped by means of long cap screws 13 extending down through opposite sides of the housing and into the threaded openings in the connector base formerly occupied by screws 4. As shown in FIG. 4, the housing is provided with a pair of bores 14 and 15 extending upwardly from its lower end. One of these bores may be shorter than the other, but their upper ends are in communication with each other, preferably by means of a transverse passage 16. Consequently, when the fluid is turned on again it can flow from the connector base 2 up through one bore, through the connecting passage 16 across to the other bore and then down and out of the second bore into the outlet portion of the passage in the connector base. As far as flow is concerned, housing 12 now takes the place of cap 3 that was removed from the connector.

To control fluid flow through the tester housing and even to stop it when desired, a valve is adjustably mounted in the outlet bore 15. Preferably, this valve includes a slidable valve member 18 that is circular and can be adjusted up and down in the housing. For this purpose the valve member has a threaded opening extending vertically through it for receiving the threaded lower end of a valve stem 19 that is rotatably mounted and sealed in a housing opening 20 extending from the upper end of the outlet bore to the top of the housing. A hand wheel 21 is mounted on the upper end of this stem so that it can be turned to move the valve member vertically between a position where it closes passage 16 and a higher position where it only partially closes the passage or leaves it fully open. The valve member is prevented from rotating with the shaft by providing the valve with a vertical passage 22, through which extends a pin 24 rigidly mounted at its upper end in the housing wall above it. The valve member can slide up and down on this pin but is prevented by it from turning. Also, the passage for the pin is made oversize so that the fluid pressure above and below the valve member can equalize itself. By making the valve member spool-shape as shown, with the spool flanges disposed above and below passage 16 while the valve is closed, the fluid pressure in that passage is exerted uniformly all around the valve member to prevent it from being forced tightly against the encircling side wall of the outlet bore, which would make it very difficult to actuate the valve.

To determine the flow rate of fluid flowing through the hydraulic circuit, various conventional flow-measuring means can be used, including opposed electrodes measuring field distortion, differential temperature between up-stream and down-stream thermistors, and pressure drop across an orifice. A most suitable means for measuring flow makes use of a turbine rotor 26 that is rotatably mounted in the inlet bore 14 of the tester housing. This rotor is rigidly mounted on the lower end of a vertical shaft 27 that extends up through a sleeve 28, the upper end of which is provided with a radial flange 29 firmly mounted in the upper end of the bore above passage 16. The upper end of the shaft projects from the upper end of the sleeve into a chamber 31 formed in the housing directly above the sleeve flange. Rigidly mounted on the upper end of the shaft in this chamber is a horseshoe magnet 32. Between the top of the turbine rotor and the lower end of sleeve 28 there is a thrust bearing 33. The portion of the sleeve below the transverse fluid passage is provided with radiating fins 34 that engage the encircling wall of the inlet bore and serve as a flow straightener. Spaced a short distance from the lower end of the rotor is another flow straightener formed from vertical fins 36 radiating from a central core 37. These two straighteners are spaced apart by a ring 38 that encircles the rotor and tightly engages the side wall of the bore. It will be seen that fluid flowing through the tester housing will cause the rotor to turn. The greater the flow, the more rapidly the rotor will rotate.

The rotating magnet can control the action of a Hall-effect sensor, a magneto-sensitive sensor, an external pulse generator or simply a magnetically operated electric switch. In the latter case the housing is provided above the magnet chamber 31 with an L-shape recess 40, in the lower horizontal portion of which the magnetically operated electric switch 41 is mounted directly over the chamber. This switch has normally open contacts that are closed when the poles of the rotating magnet are lined up directly below them. Wires 42 that extend up out of the top of the recess connect the contacts to an electrical outlet member 43 mounted in a cap 44 on the tester housing. Plugged into this outlet member is an electrical plug 46 shown in FIG. 3, which is connected by an electric cord 47 through conventional pulse-integrating electronic circuitry to a meter 48 that is calibrated to indicate the rate of fluid flow through the housing in accordance with the rate of opening and closing of the switch contacts. Since the angle at which the fluid impinges against the blades of the turbine rotor always is the same, regardless of the position of the valve 18, a linear flow reading is obtained.

The temperature of the fluid flowing through the tester housing can be determined by an electrical temperature sensor 50, such as a thermistor, that is screwed into a socket in the top of housing 12 above its transverse passage 16 as shown in FIG. 4. The sensor has a probe 51 that extends down through a passage 52 in the housing and into the top of passage 16. This temperature sensor is connected by wires 53 to the outlet member 43, which in turn is connected by wires in cord 47 to another meter 54 which will indicate the temperature of the fluid in the circuit.

The vertical passage 52, down through which the temperature probe extends, is oversize so that fluid can surround it, and an inclined passage 56 extends from one side of the probe up to the lower end of an electrical pressure transducer 57 screwed into a second socket in the top of the housing. Consequently, the pressure transducer also is subjected to the fluid pressure in the housing and is connected by wires 58 to the electrical outlet member 43, which is connected by wires in the cord to a third meter 59 that will indicate the pressure of the fluid.

Although three meters have been shown, it is to be understood that they could be combined into two or even one meter calibrated for the three readings, with a switch to switch from one reading to another.

Since the bottom of the hydraulic circuit tester disclosed herein is sealed against a flat surface when in use, it will be understood that the members to which it is fastened do not have to be provided with cavities to receive it. This means that the tester can be attached to manifolds and the like in a hydraulic circuit, which are relatively thin and have no cavities or recesses that would be necessary for receiving the probes of known hydraulic circuit testers.

According to the provisions of the patent statutes, we have explained the principle of our invention and have illustrated and described what we now consider to represent its best embodiment. However, we desire to have it understood that, within the scope of the appended claims, the invention may be practiced otherwise than as specifically illustrated and described.

We claim:

1. A hydraulic circuit tester comprising a housing provided with a mounting surface at one end and with a pair of bores extending inwardly beside each other from said surface to provide at said end an inlet port and an outlet port to register with side-by-side outlet and inlet ports in a fluid line, the inner end portions of the two bores communicating with each other, a valve member in the bore with said outlet port for throttling fluid flow therethrough, means for adjusting said valve member in said bore, electric signal emitting means associated with the other bore and responsive to fluid flowing through the housing, and means for electrically connecting said signal emitting means to means for indicating the flow rate of said fluid.

2. A hydraulic circuit tester according to claim 1, in which said bores are substantially parallel, the housing including a transverse passage connecting the inner end portions of the two bores.

3. A hydraulic circuit tester according to claim 1, in which said signal emitting means include a turbine rotor for rotation by the fluid, and means responsive to the rotation of said rotor connected with said connecting means, the tester also including an electrical pressure sensor mounted in the wall of said housing and engageable by fluid flowing through the housing between its inlet port and said valve member.

4. A hydraulic circuit tester according to claim 1, in which said signal emitting means include a turbine rotor for rotation by the fluid, and means responsive to the rotation of said rotor connected with said connecting means, the tester also including a temperature sensor at the upstream side of said valve member in a position to be surrounded by fluid flowing through said housing.

5. In a hydraulic circuit, a connector having a passage therethrough provided with an inlet and an outlet permanently connected in the circuit for flow of fluid through the connector, the connector having a base and a cap detachably mounted thereon, said inlet and outlet being in said base, portions of said passage extending from said inlet and outlet into the base and up to its top to form two intermediate ports in the top of the base, the remaining portion of the passage being disposed in said cap and connecting said ports, a testing housing provided with a pair of bores extending inwardly from one end thereof with their inner end portions communicating with each other, means for mounting said end of the housing on said base when said cap is removed, with the open ends of said bores registering with said ports, a valve member in the bore connected with said outlet for throttling fluid flow therethrough, means for adjusting said valve member, electric signal emitting means associated with the other bore and responsive to predetermined fluid conditions in said housing, and means responsive to said signal emitting means for indicating said fluid conditions in said housing.

6. In a hydraulic circuit as defined in claim 5, said signal emitting means including an electrical pressure transducer exposed to fluid pressure in said housing at the upstream side of said valve, and a temperature sensor responsive to the temperature of fluid flowing through said housing.

7. In a hydraulic circuit as defined in claim 5, said signal emitting means including a turbine rotor mounted in said other bore for rotation by fluid flowing through the housing, a magnet rotatable by the turbine, and means responsive to the rotation of the magnet for emitting said signal.

* * * * *